United States Patent Office 3,056,800
Patented Oct. 2, 1962

3,056,800
PYRROLO ISOINDOLES AND PROCESS FOR PREPARING SAME
Max Francois Antoine Viscontini, Zurich, and Kurt Adank, Muttenz, Basel-Land, Switzerland, assignors to Geigy Chemical Corporation, Ardsley, N.Y., a corporation of Delaware
No Drawing. Filed Oct. 28, 1960, Ser. No. 65,569
Claims priority, application Switzerland Oct. 31, 1958
15 Claims. (Cl. 260—325)

The present invention concerns new N-heterocyclic compounds which can be used in particular as pharmaceuticals and intermediate products in the production of pharmaceuticals, as well as processes for the production of these new compounds.

An object of this invention is to provide compounds of the general formulae

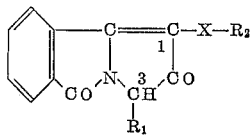

I and

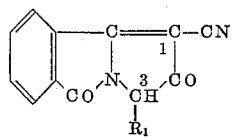

II wherein:
X represents a bivalent radical —CO—O— or —CO—,
$R_1$ represents hydrogen, lower alkyl, cyclohexyl, phenyl, chlorophenyl, lower alkylphenyl, lower alkoxyphenyl, methylenedioxyphenyl, benzyl, chlorobenzyl, nitrobenzyl, lower alkylbenzyl, lower alkoxybenzyl or methylenedioxybenzyl, and
$R_2$ represents lower alkyl, lower chloroalkyl, allyl, cyclohexyl, phenyl, benzyl or benzyloxy-lower alkyl and a process for preparing same.

Compounds of the above general formulae may be present to some extent in the tautomeric enol forms corresponding to the general formulae

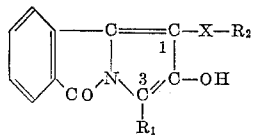

Ia and

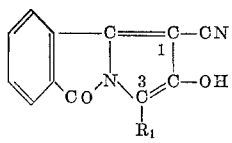

IIa

In cases where $R_1$ is a phenyl radical or a chlorophenyl, a lower alkylphenyl, a lower alkoxyphenyl or a methylenedioxyphenyl radical, the enol form may even prevail. However, in order to simplify the following description, all compounds are referred to therein as having the constitution of dioxo compounds of general Formula I or II.

These compounds of the general Formulae I and II are valuable intermediate products for the production of pharmaceuticals.

A further object of this invention is to provide compounds of the general formulae

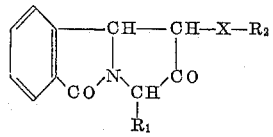

III and

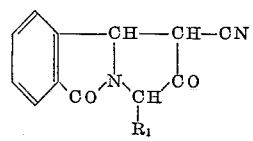

IV and the tautomeric forms

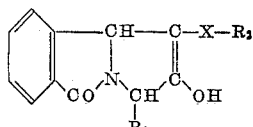

IIIa and

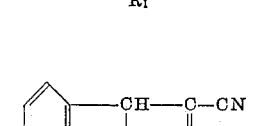

IVa wherein:
X represents a bivalent radical —CO—O— or —CO—,
$R_1$ represents hydrogen, lower alkyl, cyclohexyl, phenyl, chlorophenyl, lower alkylphenyl, lower alkoxyphenyl, methylenedioxyphenyl, benzyl, chlorobenzyl, nitrobenzyl, lower alkylbenzyl, lower alkoxybenzyl or methylenedioxybenzyl, and
$R_2$ represents lower alkyl, lower chloroalkyl, allyl, cyclohexyl, phenyl, benzyl or benzyloxy-lower alkyl.

This second group of compounds according to the invention has valuable pharmacological properties. In particular such compounds have anticonvulsive and anaesthesia-potentiating activity and can be used, among other purposes, as psychosedatives on oral administration. In addition, they can also be used as intermediate products for the production of other pharmacologically active substances.

In these compounds, lower alkyl radicals $R_1$ are, e.g.: the methyl, ethyl, n-propyl, isopropyl, n-butyl, isobutyl, sec. butyl, n-amyl, isoamyl, n-hexyl or 1,3-dimethylbutyl radical. Examples of substituted phenyl and benzyl radicals $R_1$ according to the above definition are: o-tolyl, m-tolyl, p-tolyl, p-ethylphenyl, p-isopropylphenyl, p-tert. butylphenyl, 3,4-dimethylphenyl, o-methoxyphenyl, m-ethoxyphenyl, p-methoxyphenyl, p-ethoxyphenyl, p-isopropoxyphenyl, 3,4-dimethoxyphenyl, o-chlorophenyl, m-chlorophenyl, p-chlorophenyl, 3,4-dimethylenedioxyphenyl, benzyl, o-methylbenzyl, p-isopropylbenzyl, 3,4-dimethylbenzyl, p-methoxybenzyl, p-ethoxybenzyl, 3,4-dimethoxybenzyl, 3,4,5-trimethoxybenzyl, p-chlorobenzyl, 3,4-methylenedioxybenzyl, and p-nitrobenzyl radicals.

Lower alkyl and lower chloroalkyl radicals $R_2$ are, e.g.: the methyl, ethyl, n-propyl, isopropyl, n-butyl, isobutyl, tert. butyl, n-amyl, isoamyl, n-hexyl, β-chloroethyl and γ-chloropropyl radicals.

Benzyloxy-lower alkyl radicals $R_2$ are especially β-benzyloxyethyl and γ-benzyloxypropyl radicals.

Of the new compounds of the general Formula III and IIIa those are preferred wherein the symbols $X—R_2$ together represent lower carbalkoxy group, a lower chlorocarbalkoxy group or a lower alkanoyl group. As radicals $R_1$, the phenyl radical and lower alkyl radicals are of particular value.

Compounds of the general Formulae I and II are produced by heating compounds of the general formula

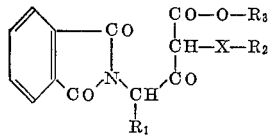

V or

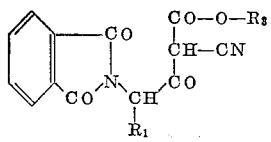

VI wherein $R_3$ represents a radical corresponding to the definition for $R_2$, in particular a low molecular alkyl radical, e.g. the methyl radical or ethyl radical and X, $R_1$ and $R_2$ have the meanings given above, in a pyridine base until no more carbon dioxide is developed, i.e. until about an equimolecular amount has been liberated. Advantageously, starting materials of the general Formula V or VI are boiled under reflux in pyridine, but they can also be heated, for example, in pyridine, a picoline, lutidine, collidine or a mixture of such methyl pyridines at temperatures between about 100° C. and the boiling temperature of the medium chosen. Starting materials of the general Formula V are, depending on the meaning of X, on the one hand (α-phthalimido-acyl)-malonic acid diesters and on the other γ-phthalimido-β-keto-α-acyl carboxylic acid esters.

Compounds of the general Formula I with the exception of those in which $R_1$ is hydrogen are obtained by a second process if γ-phthalimido-β-keto-α-acyl carboxylic acid esters of γ-phthalimido-α-acyl-β-diketones of the general formula

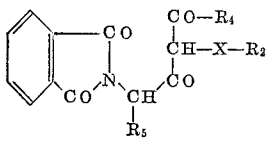

VII wherein:

$R_4$ represents a radical corresponding to the definition given above for $R_2$, $R_5$ represents a lower alkyl radical, a cyclohexyl radical, a chlorophenyl, lower alkylphenyl, lower alkoxyphenyl, methylenedioxyphenyl, benzyl, chlorobenzyl, nitrobenzyl, lower alkylbenzyl, lower alkoxybenzyl and methylenedioxybenzyl radical, and X and $R_2$ have the meanings given above, are treated in an aqueous-alcoholic medium at 0 to about 80° C., with ammonia. In this reaction the acyl group —CO—$R_4$ is split off and the ring is closed while splitting off water. Advantageously the reaction is performed in aqueous-methanolic or aqueous-ethanolic solution at the reflux temperature. It is also of advantage if the reaction is performed in a nitrogenous atmosphere. The compounds obtained according to this process correspond to the general formula

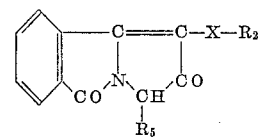

VIII wherein X, $R_2$ and $R_5$ have the meanings given above, which formula is embraced by general Formula I.

Compounds of the general Formula I are obtained by a third process if starting materials of the general formula

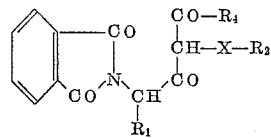

IX or

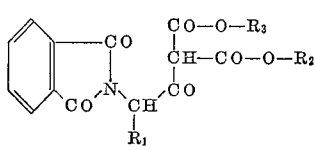

X wherein X, $R_1$, $R_2$, $R_3$ and $R_4$ have the meanings given above, are heated at temperatures between 80 and 200° C. in sodium acetate which can be either crystalline or anhydrous. In this reaction, the acyl radical —CO—$R_4$ if present and if not, a carboxylic acid ester group is split off, $CO_2$ being developed. The starting materials of the general Formula X are identical with those compounds of the general Formula V in which X is —CO—O— and the starting materials of the general Formula IX, provided that $R_1$ therein is not hydrogen, are identical with those of general Formula VII.

These three processes differ not only by the reactants necessary for the elimination of a radical and ring closure and the starting materials necessary for each. Far more important is the fact that although in each case an acyl radical and a carboxylic acid ester group is present, in the first process it is the carboxylic acid ester group and in the second and third processes it is the acyl group which is split off. Thus, for the production of end products having a 1-acyl group (X=CO), in the first process, γ-phthalamido-β-keto-α-acyl carboxylic acid esters can be used whilst for the production of the same compounds by the second or third process the generally more difficultly produced γ-phthalimido-α-acyl-β-diketones are necessary.

The starting materials of the general Formula V are obtained, for example, by condensing an α-phthalimidocarboxylic acid halide of the general formula

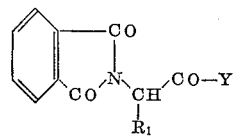

XI wherein Y is chlorine or bromine and $R_1$ has the meaning given above, by means of a metal of the first or second group or by means of a derivative of such a metal, with a malonic acid ester or a β-keto-carboxylic acid ester of the general formula

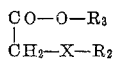
XII wherein X, $R_2$ and $R_3$ have the meanings given above.

In this condensation, examples of condensing agents are: lithium, sodium, potassium or magnesium or derivatives of these metals such as, e.g. alcoholates, the amides or hydrides in a polar or non-polar organic solvent or in a mixture of such solvents. The magnesium alcoholates such as, e.g. magnesium ethylate, are particularly suitable condensing agents.

In an analogous manner, halides of general Formula XI can be condensed with cyanoacetic acid esters of the general formula

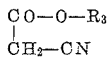
XIII in order to yield starting compounds of general Formula VI, or with malonic acid esters of the general formula

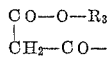
XIV whereby starting compounds of General Formula X are obtained.

Starting compounds of general Formula VII are also obtained in an analogous manner by condensing an α-phthalimido-carboxylic acid halide of the general formula

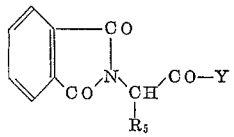
XV wherein $R_5$ and Y have the meanings given above, with a β-keto-carboxylic acid ester or with a β-diketone of the general formula

XVI wherein X, $R_2$ and $R_4$ have the meanings given above.

As will be seen from the definitions of the symbols $R_1$, $R_2$, $R_3$, $R_4$, $R_5$ and X, as has been said with regard to the starting compounds as defined in general Formulae V–XI, also the general Formulae XI and XVI embrace to some extent the same compounds; in particular all halides of the general Formula XV are embraced by general Formula XI.

On the one hand, starting compounds of the general Formula V are (α-phthalimido-acyl)-malonic acid diesters such as e.g., the dimethyl esters, diethyl esters, di-n-propyl esters, di-n-butyl esters, diallyl esters, di-β-chloroethyl esters, di-γ-chloropropyl esters, diphenyl esters, dibenzyl esters and di-β-benzyloxyethyl esters of (α-phthalimido-acetyl)-malonic acid,
(α-phthalimido-propionyl)-malonic acid,
(α-phthalimido-butyryl)-malonic acid,
(α-phthalimido valeryl)-malonic acid,
(α-phthalimido-isovaleryl)-malonic acid,
(α-phthalimido-hexanoyl)-malonic acid,
(α-phthalimido-heptanoyl)-malonic acid,
(α-phthalimido-δ-methyl-hexanoyl)-malonic acid,
(α-phthalimido-α-phenyl-acetyl)-malonic acid,
[α-phthalimido-α-(p-chlorophenyl)-acetyl]-malonic acid,
[α-phthalimido-α-(m-methylphenyl)-acetyl]-malonic acid,
[α-phthalimido-α-(3,4,-dimethoxyphenyl)-acetyl]-malonic acid,
[α-phthalimido-α-(p-methoxyphenyl)-acetyl]-malonic acid,
(α-phthalimido-β-phenylpropionyl)-malonic acid,
[α-phthalimido-β-(p-chlorophenyl)-propionyl]-malonic acid and
[α-phthalimido-β-(p-nitrophenyl)-propionyl]-malonic acid.

These compounds are also suitable as starting materials of the general Formula X for the third production process mentioned.

On the other hand, general Formula V also embraces γ-phthalimido-β-keto-α-acyl carboxylic acid esters such as, e.g. the methyl esters and ethyl esters of γ-phthalimido-β-oxo-α-acetyl-butyric acid,
γ-phthalimido-β-oxo-α-acetyl-valeric acid,
γ-phthalimido-β-oxo-α-propionyl-valeric acid,
γ-phthalimido-β-oxo-α-butyryl-valeric acid,
γ-phthalimido-β-oxo-α-acetyl-hexanoic acid,
γ-phthalimido-β-oxo-α-acetyl-heptanoic acid,
γ-phthalimido-δ-methyl-β-oxo-α-acetyl-hexanoic acid,
γ-phthalimido-β-oxo-α-acetyl-octanoic acid,
γ-phthalimido-γ-cyclohexyl-β-oxo-α-acetyl-butyric acid,
γ-phthalimido-γ-phenyl-β-oxo-α-acetyl-butyric acid,
γ-phthalimido-γ-phenyl-β-oxo-α-butyryl-butyric acid,
γ-phthalimido-γ-phenyl-β-oxo-α-isobutyryl-butyric acid,
γ-phthalimido-γ-phenyl-β-oxo-α-benzoyl-butyric acid,
γ-phthalimido-γ-phenyl-β-oxo-α-phenylacetyl-butyric acid,
γ-phthalimido-γ-(p-methylphenyl)-β-oxo-α-acetyl-butyric acid,
γ-phthalimido-γ-(p-isopropylphenyl)-β-oxo-α-acetyl-butyric acid,
γ-phthalimido-γ-(p-chlorophenyl)-β-oxo-α-acetyl-butyric acid,
γ-phthalimido-γ-(p-methoxyphenyl)-β-oxo-α-acetyl-butyric acid,
γ-phthalimido-δ-phenyl-β-oxo-α-acetyl-valeric acid,
γ-phthalimido-δ-(p-nitrophenyl)-β-oxo-α-acetyl-valeric acid,
γ-phthalimido-δ-(p-isopropylphenyl)-β-oxo-α-acetyl-valeric acid,
γ-phthalimido-δ-(3,4-dimethoxyphenyl)-β-oxo-α-acetyl-valeric acid and
γ-phthalimido-δ-(3,4,5-trimethoxyphenyl)-β-oxo-α-acetyl-valeric acid.

The above compounds are also suitable as starting compounds of general Formula IX for the third production process and, with the exception of the esters of γ-phthalimido-β-oxo-α-acetyl-butyric acid, as starting compounds of general Formula VII for the second production process. As, in these processes, the acyl group is split off, the use of compounds having an α-acyl radical other than the acetyl radical is of less interest. On the other hand, because of the retention of the carboxylic acid ester group, esters other than the methyl and ethyl esters are valuable as starting materials for the second and third production processes, for example, the n-propyl esters, isopropyl esters, n-butyl esters, isobutyl esters, sec. butyl esters, tert. butyl esters, allyl esters, phenyl esters and benzyl esters.

Examples of other starting materials embraced by general Formula IX are 3-(α-phthalimido-acetyl)-pentane-2,4-dione, and 4-(α-phthalimido-acetyl)-heptane-3,5-dione. Examples of starting materials embraced by both general Formula VII and IX are
3-(α-phthalimido-propionyl)-, 3-(α-phthalimido-butyryl)-, 3-(α-phthalimido-isovaleryl)-,
3-(α-phthalimido-α-phenyl-acetyl)-, 3-(α-phthalimido-β-phenyl-propionyl)- and 3-[α-phthalimido-α-(3',4'-methylenedioxy-phenyl)-acetyl]-pentane-2,4-dione,
4-(α-phthalimido-α-phenyl-acetyl)-heptane-3,5-dione, 4-(α-phthalimido-α-phenyl-acetyl)-2,6-dimethyl-heptane-3,5-dione, 3-(α-phthalimido-α-phenyl-acetyl)-5-methyl-hexane-2,4-dione, 3-(α-phthalimido-α-phenyl-acetyl)-1-phenyl-butane-1,3-dione and
2-(α-phthalimido-α-phenyl-acetyl)-1-phenyl-pentane-2,4-dione.

Examples of starting compounds of general Formula VI are (α-phthalimido-acetyl)-, (α-phthalimido-propionyl)-, (α-phthalimido-isovaleryl)-, (α-phthalimido - α - phenyl-acetyl)-, (α - phthalimido - β - phenyl - propionyl) - and (α-phthalimido-γ-phenyl-butyryl)-cyanoacetic acid ethyl esters as well as other cyanoacetic acid derivatives corresponding to the examples of malonic acid derivatives of general Formula V.

Compounds of the general Formulae III and IV are obtained by treating compounds of the general Formulae I and II in an organic medium at a temperature between 0 and 50° C. with an alkali metal borhydride, in particular with sodium borhydride. Surprisingly, not the reduction of the keto group which was principally to be expected, but that of the double bond occurs in this reaction.

Pyridine in particular is suitable as reaction medium and also as solvent for the sodium borhydride. Also, tetrahydrofuran or dioxan, possibly in admixture with diethyl ether or another dialkyl ether can be used as reaction medium especially with starting materials having a marked tendency to enolisation and salt formation, i.e. mainly with compounds in which $R_1$ is an aromatic radical and —X—$R_2$ is an ester group. In this case, the sodium borhydride, e.g. as solution in aqueous ethanol, is added to the previously prepared solution of the starting material.

The following examples further illustrate the production of the new compounds according to the invention. Parts are given therein as parts by weight and their relationship to parts by volume is as that of grammes to cubic centimetres. The temperatures are in degrees centigrade. With regard to the examples which give no amount of the starting compound, it should be noted that the ratio of starting compound to condensing agent, i.e. to the pyridine base or ammonia or to the sodium acetate, can be quantitatively always the same in the examples which give the amounts of starting compounds independently of the molecular weight of the starting compound. However, when ammonia is used as condensing agent at higher temperatures, a great excess thereof should not be used in order to avoid side reactions.

All reactions are performed in an atmosphere of nitrogen.

*Example 1*

3 parts of magnesium are dissolved while excluding moisture in 20 parts of anhydrous ethanol, then 15 parts of acetoacetic acid ethyl ester dissolved in 50 parts by volume of anhydrous ether are added and finally, a solution of 30 parts of α-phthalimido-α-phenyl-acetyl chloride in 200 parts by volume of anhydrous benzene are added dropwise. On completion of the reaction, the magnesium complex formed is decomposed with dilute, cooled sulphuric acid, the organic phase is isolated, washed and dried and concentrated. The γ-phthalimido-γ-phenyl-β-oxo-α-acetyl-butyric acid ethyl ester which remains gradually crystallises. It is obtained on recrystallisation from ethanol in the form of long, colourless prisms which melt at 115°.

40 parts of this product are dissolved in ethanol, 25 parts by volume of an 8% ethanolic ammonia solution are added dropwise and the reaction mixture is left to stand in the cold for about 15 hours while excluding air. 3-phenyl-2,5(3H)-dioxo-5H - pyrrolo[2,1 - a]isoindole-1-carboxylic acid ethyl ester separates out in the form of red-brown crystals. It can be recrystallised, for example from ethanol. It melts at 167°.

*Example 2*

Analogously to Example 1, 6 parts of magnesium are dissolved in 40 parts of anhydrous ethanol, reacted with 30 parts of acetoacetic acid methyl ester and then reacted with 60 parts of α-phthalimido-α-phenyl-acetyl chloride in 400 parts by volume of anhydrous benzene. After working up in the usual way, γ-phthalimido-γ-phenyl-β-oxo-α-acetyl-butyric acid methyl ester is obtained which crystallises immediately in methanol. The colourless prisms melt at 162°.

23 parts of this compound are dissolved hot in 160 parts by volume of ethanol and 7 parts by volume of concentrated ammonia and 20 parts by volume of water are added while excluding air. After boiling for 3 minutes under reflux, the reaction mixture is cooled. A strong exothermic reaction takes place and red crystals are formed. These are filtered off under suction and washed with ethanol. On recrystallising from glacial acetic acid, 3-phenyl-2,5(3H)-dioxo-5H - pyrrolo[2,1 - a]isoindole - 1-carboxylic acid methyl ester is obtained in the form of red crystals which melt at 176°.

*Example 3*

1.5 parts of magnesium are dissolved in 10 parts of anhydrous ethanol and 25 parts by volume of anhydrous ether while excluding moisture and then 10 parts of acetoacetic acid tert. butyl ester dissolved in 25 parts by volume of anhydrous ether are slowly added. After 1 hour, a solution of 15 parts of α-phthalimido-α-phenyl acetyl chloride in 100 parts by volume of anhydrous benzene is added dropwise while cooling. On completion of the reaction, γ-phthalimido-γ-phenyl-β-oxo-α-acetyl - butyric acid tert. butyl ester is obtained by the method given in Example 1. It is a yellowish oil which solidifies in alcohol and ether and, when recrystallised from ethanol, melts at 127°.

10 parts of this product are treated as described in Example 2 with concentrated ammonia. The 3-phenyl-2,5(3H)-dioxo-5H-pyrrolo[2,1-a]isoindole - 1 - carboxylic acid tert. butyl ester formed separates in the form of red-brown needles and can be recrystallised for example from ethanol. It melts at 152°.

*Example 4*

With α-phthalimido-α-(p-methoxyphenyl)-acetyl chloride, γ-phthalimido-γ-(p-methoxyphenyl)-β-oxo-α - acetyl-butyricacid ethyl ester is obtained as given in Example 1. It can be recrystallised for example from alcohol and melts at 138°.

3-(p-methoxyphenyl) - 2,5(3H) - dioxo - 5H - pyrrolo-[2,1-a]isoindole-1-carboxylic acid ethyl ester is obtained therefrom with ammonia analogously to Example 1 or 2. It crystallises in violet needles and melts at 160°.

3-(p-ethoxyphenyl)-2,5(3H) - dioxo - pyrrolo[2,1 - a] isoindole-1-carboxylic acid ethyl ester is obtained in an analogous manner starting from γ-phthalimido-γ-(p-ethoxyphenyl)-β-oxo-α-acetyl-butyric acid ethyl ester.

*Example 5*

3 parts of magnesium are dissolved in 20 parts of alcohol and 50 parts by volume of ether while excluding moisture, then 23.6 parts of acetoacetic acid benzyl ester dissolved in 50 parts by volume of ether are slowly added. After 4 hours, 30 parts of α-phthalimido-α-(p-methoxyphenyl)-acetyl chloride in 200 parts by volume of anhydrous benzene are added. On completion of the reaction, the product is worked up analogously to Example 1. The γ - phthalimido- γ-(p-methoxyphenyl)-β-oxo-α-acetyl-butyric acid benzyl ester formed melts at 135°.

On treating with ammonia analogously to Examples 1 and 2, 3 - (p - methoxyphenyl) - 2,5(3H) - dioxo - 5H-pyrrolo[2,1 - a]isoindole - 1 - carboxylic acid benzyl ester is obtained; M.P. 145°.

*Example 6*

With α - phthalimido - α - (p - chlorophenyl) - acetyl chloride, γ - phthalimido - γ - (p - chlorophenyl) - β-oxo - α - acetyl butyric acid ethyl ester (M.P. 101°) is obtained analogously to Example 1.

Analogously to Example 1 or 2, this product produces with ammonia 3 - (p - chlorophenyl) - 2,5(3H) - dioxo-5H - pyrrolo[2,1 - a]isoindole - 1 - carboxylic acid ethyl ester which can be recrystallised, e.g. from ethanol. It melts at 216°.

*Example 7*

Analogously to Example 2, γ - phthalimido - γ - (3,4-methylene - dioxyphenyl) - β - oxo - α - acetyl - butyric acid methyl ester (M.P. 156°) is obtained from α - phthalimido - α - (3,4 - methylenedioxyphenyl) - acetyl chloride. The ethyl ester melts at 153° and the tert. butyl ester melts at 136°.

3 - (3',4' - methylenedioxyphenyl) - 2,5(3H) - dioxo-5H - pyrrolo - [2,1 - a]isoindole - 1 - carboxylic acid methyl ester, (M.P. 184–185°), and the ethyl ester (M.P. 161–162°) and the tert. butyl ester are obtained from the corresponding esters and ammonia analogously to Example 1 or 2.

*Example 8*

γ - Phthalimido - δ - phenyl - β - oxo - α - acetyl - valeric acid ethyl ester is obtained with α-phthalimido-β-phenyl-propionyl chloride analogously to Example 1. Recrystallised from ethanol it melts at 102°.

23 parts of this compound are dissolved in 150 parts by volume of 80% ethanol and 6 parts by volume of concentrated ammonia in 10 parts by volume of water are added at 80° while excluding air. On completion of the reaction, the reaction mixture is cooled and the product which precipitates is recrystallised from ethanol. 3 - benzyl - 2,5(3H) - dioxo - 5H - pyrrolo[2,1 - a]isoindole-1 - carboxylic acid ethyl ester is obtained as yellowish prisms which melt at 135°.

*Example 9*

γ - Phthalimido - β - oxo - α - acetyl - valeric acid methyl ester is obtained with α - phthalimido - propionyl chloride analogously to Example 2. It melts at 102°.

6.5 parts thereof are dissolved in 50 parts by volume of 80% ethanol and 2 parts by volume of concentrated ammonia are added at 80° while excluding air. When the solution has turned a dark red colour (after about 15 minutes), it is cooled. After cooling for a considerable time with ice, red prisms separate out. Recrystallised from ethanol, 3 - methyl - 2,5(3H) - dioxo - 5H-pyrrolo[2,1 - a]isoindole - 1 - carboxylic acid methyl ester is obtained in the form of yellow-orange prisms which melt at 145°.

*Example 10*

With α - phthalimido - isovaleryl chloride analogously to Example 1, γ - phthalimido - β - oxo - α - acetyl - ε-methyl - heptanoic acid methyl ester is obtained which without being crystallised is reacted direct with ammonia analogously to Example 9.

The 3 - isopropyl - 2,5(3H) - dioxo - 5H - pyrrolo[2,1-a]isoindole - 1 - carboxylic acid methyl ester obtained in yellow-orange platelets when crystallised from ethanol, melts at 122°.

*Example 11*

γ - Phthalimido - γ - (p - chlorophenyl) - β - oxo - α-acetyl - butyric acid allyl ester is produced analogously to Example 1 with α - phthalimido - α -(p - chlorophenyl)-acetyl chloride and acetoacetic acid allyl ester. This product is reacted direct with ammonia analogously to Example 2 without previously purifying.

3 - (p - chlorophenyl) - 2,5(3H) - dioxo - 5H - pyrrolo [2,1 - a]isoindole - 1 - carboxylic acid allyl ester can be recrystallised from ethanol and is obtained in the form of red-brown needles. M.P. 170°.

*Example 12*

γ - Phthalimido - γ -phenyl - β - oxo - α - acetyl - butyric acid benzyl ester is produced as described in Example 5 with α - phthalimido - α - phenyl acetyl chloride. The colourless crystals obtained melt at 131°.

On treatment with ammonia analogously to Example 1 or 2, 3 - phenyl - 2,5(3H) - dioxo - 5H - pyrrolo[2,1-a]isoindole - 1 - carboxylic acid benzyl ester is obtained.

Recrystallised from ethanol it is in the form of red-brown needles and melts at 158°.

*Example 13*

γ - Phthalimido - γ - (p - isopropylphenyl) - β - oxo - α-acetyl - butyric acid ethyl ester is produced as described in the above examples with α - (p - isopropylphenyl)-acetyl chloride and acetoacetic acid ester. It melts at 108°.

On treating with ammonia analogously to Example 1 or 2, 3 - (p - isopropylphenyl) - 2,5(3H) - dioxo - 5H-pyrrolo[2,1 - a]isoindole - 1 - carboxylic acid ethyl ester is obtained, M.P. 175°.

Starting from γ - phthalimido - γ - (p - methylphenyl)-β - oxo - α - acetyl - butyric acid ethyl ester, 3 - (p -methylphenyl) - 2,5(3H) - dioxo - 5H - pyrrolo[2,1 - a]isoindole - 1 - carboxylic acid ethyl ester is obtained and starting from γ - phthalimido - γ - (3,4 - dimethylphenyl) - β-oxo - α - acetyl - butyric acid ethyl ester, 3 - (3',4' - dimethylphenyl) - 2,5(3H) - dioxo - 5H - pyrrolo[2,1 - a] isoindole - 1 - carboxylic acid ethyl ester is obtained in an analogous manner.

*Example 14*

A magnesium ethylate solution is prepared while excluding moisture from 1.5 parts of magnesium and 12 parts by volume of ethanol and 6 parts of acetyl acetone dissolved in 50 parts of volume of anhydrous ether followed by 12.5 parts of α-phthalimido α-phenyl acetyl chloride dissolved in 100 parts by volume of benzene are slowly added to the magnesium solution. On completion of the reaction, the magnesium complex compound is decomposed by carefully adding dilute, cooled sulphuric acid. The organic phase is then separated, washed with water, dried and concentrated.

The 3 - (α - phthalimido - α - phenyl - acetyl) - pentane - 2,4 - dione which remains as crude product is dissolved in ethanol, 12 parts of 8% ethanolic ammonia solution are added and the whole is left to stand for about 15 hours. The product is worked up analogously to Example 1. The 1 - acetyl - 3 - phenyl - 5H - pyrrolo [2,1 - a]isoindole - 2,5(3H) - dione obtained crystallises in yellow prisms and melts at 183°.

*Example 15*

39.3 parts of γ-phthalimido-γ-phenyl-β-oxo-α-acetyl-butyric acid ethyl ester described in Example 1 are refluxed in 200 parts of anhydrous pyridine until no more $CO_2$ is developed. After about 10 hours, the reaction solution is poured onto ice, it is acidified with concentrated hydrochloric acid and the precipitated red-brown crude 1-acetyl-3-phenyl-5H-pyrrolo[2,1-a]-isoindole-2,5-(3H)-dione is isolated. It is recrystallised from ethanol when it is then in the form of yellow platelets which melt at 183°. It is identical with the compound described in Example 14.

*Example 16*

3 parts of magnesium are dissolved in 20 parts of anhydrous ethanol while excluding moisture, 16 parts of malonic acid diethyl ester dissolved in 50 parts by volume of anhydrous ether are slowly added and then a solution of 30 parts of α-phthalimido-α-phenyl acetyl chloride in 200 parts by volume of anhydrous benzene is added dropwise. On completion of the reaction, the magnesium complex formed is decomposed with dilute, cooled sulphuric acid, the organic phase is isolated, washed, dried and concentrated. The remaining (α-phthalimido-α-phenyl-acetyl)- malonic acid diethyl ester is dissolved in hot alcohol from which it crystallises in the form of colourless needles. It melts at 105–106°.

4.23 parts of this product in 25 parts by volume of anhydrous pyridine are refluxed for 14 hours. The reaction solution is then poured onto ice, acidified with concentrated hydrochloric acid and the precipitated red 3 - phenyl - 2,5(3H)-dioxo-5H-pyrrolo[2,1-a]isoindole-1-carboxylic acid ethyl ester is isolated. It melts at 167° and is identical with the compound described in Example 1.

Example 17

γ - Phthalimido - γ - phenyl-β-oxo-α-acetyl-butyric acid methyl ester is produced with 12 parts of acetoacetic acid methyl ester analogously to Example 16. Recrystallised from methanol it melts at 160°.

3.8 parts of this compound in 25 parts by volume of anhydrous pyridine are refluxed for 8 hours. The reaction solution is then poured into ice-cold hydrochloric acid and the precipitated red-brown product is isolated. After recrystallising from ethanol, it melt at 183°. The compound is identical to that described in Examples 1 and 16.

Example 18

γ - Phthalimido - γ - phenyl-β-oxo-α-cyano-butyric acid ethyl ester is produced with 12 parts of cyanoacetic acid ethyl ester analogously to Example 16. M.P. 148° from ethanol.

5.5 parts of this compound in 50 parts by volume of pyridine are refluxed for 9 hours. The reaction solution is then poured onto ice and acidified with concentrated hydrochloric acid. The precipitated 1-cyano-3-phenyl-5H-pyrrolo[2,1-a]isoindole-2,5(3H)-dione is recrystallised from ethanol. It separates in the form of yellow-brown prisms and melts at 198°.

3.4 parts of 2-cyano-3-oxo-4-phthalimido-5-methyl-caproic acid ethyl ester (produced from α-phthalimido-isovaleryl chloride and cyanoacetic acid ethyl ester analogously to Example 16) in 25 parts by volume of pyridine are refluxed for 20 hours. The reaction solution is then poured onto ice and the pH is adjusted to about 4 with concentrated hydrochloric acid. After stirring vigorously, the precipitated 1-cyano-3-isopropyl-5H-pyrrolo[2,1-a]isoindole-2,5(3H)-dione is separated, washed neutral and recrystallised from alchol. It forms yellow prisms which melt at 149–151°.

Example 19

γ - Phthalimido - δ - phenyl - β-oxo-α-acetyl-valeric acid ethyl ester is obtained with α-phthalimido-β-phenylpropionyl chloride analogously to Example 1. Recrystallised from ethanol it melts at 102°.

4.08 parts of this compound in 25 parts by volume of anhydrous pyridine are refluxed until no more $CO_2$ is developed. The reaction solution is then poured onto ice and the pH is adjusted to 2 with concentrated hydrochloric acid. The yellow-red sticky mass is isloated, washed with water and recrystallised from ethanol. 1-acetyl-3-benzyl-5H-pyrrolo[2,1-a]isoindole-2,5(3H)-dione is in the form of yellow platelets. It melts at 140°.

1 - isobutyryl-3-benzyl-5H-pyrrolo[2,1-a]isoindole-2,5-(3H)-dione (M.P. 133–135°) is obtained in an analogous manner starting from γ-phthalimido-δ-phenyl-β-oxo-α-isobutyryl-valeric acid ethyl ester.

Example 20

γ-Phthalimido-β-oxo-α-acetyl-valeric acid methyl ester (M.P. 102°) is obtained with α-phthalimido-propionyl chloride analogously to Example 1.

3.17 parts of this compound in 25 parts by volume of anhydrous pyridine are refluxed until no more $CO_2$ is developed. The reaction solution is then poured onto ice, the pH is adjusted to about 2 by stirring with concentrated hydrochloric acid and the precipitated brown residue is isolated, washed with water and dissolved in hot ethanol. 1 - acetyl - 3-methyl-5H-pyrrolo[2,1-a]isoindole-2,5(3H)-dione separates in the form of pale yellow needles. It melts at 142°.

Example 21

γ-Phthalimido-β-oxo-α-acetyl-butyric acid ethyl ester (M.P. 137°) is obtained with α-phthalimido-acetyl chloride analogously to Example 1.

3.18 parts of this compound in 25 parts by volume of sym. collidine are heated to 160–180° for about 14 hours. The reaction solution is then poured onto ice, the pH is brought to about 2 with concentrated hydrochloric acid, the precipitated brown mass is isolated and rubbed with ether. 1 - acetyl-5H-pyrrolo[2,1-a]isoindole-2,5(3H)-dione separates in yellow-brown prisms which melt at 217°.

Example 22

(α-Phthalimido-β-phenyl-propionyl)-malonic acid diethyl ester is obtained with α-phthalimido-β-phenyl-propionyl chloride analogously to Example 16 and it is treated with pyridine direct in its crude oily form analogously to Example 19. The 3-benzyl-2,5(3H)-dioxo-5H-pyrrolo[2,1-a]isoindole-1-carboxylic acid ethyl ester obtained melts at 135° and is identical with the compound obtained according to Example 8.

In an analogous manner, 3-(p-chlorobenzyl)-2,5(3H)-dioxo-5H-pyrrolo[2,1-a]isoindole-1-carboxylic acid ethyl ester (M.P. 161–162°) is obtained from [α-phthalimido-β-(p-chlorophenyl)-propionyl]-malonic acid diethyl ester; 3 - (p - methylbenzyl)2,5(3H) - dioxo - 5H - pyrrolo-[2,1-a]isoindole-1-carboxylic acid ethyl ester is obtained from [α - phthalimido - β - (p-methylphenyl)-propionyl]-malonic acid diethyl ester; 3-(p-isopropylbenzyl)-2,5-(3H) - dioxo - 5H - pyrrolo[2,1-a]isoindole - 1 - carboxylic acid ethyl ester is obtained from [α-phthalimido-β-(p-isopropylphenyl)-propionyl]-malonic acid diethyl ester; (3-phenyl-2,5(3H)-dioxo-5H-pyrrolo[2,1-a]isoindole-1-carboxylic acid phenyl ester is obtained from (α-phthalimido-α-phenyl-propionyl)-malonic acid diphenyl ester; 3 - phenyl-2,5(3H)-dioxo-5H-pyrrolo[2,1-a]isoindole-1-carboxylic acid-β-chloroethyl ester, M.P. 187–189° is obtained from (α-phthalimido-α-phenylpropionyl)-malonic acid di-β-chloroethyl ester; 3-phenyl-2,5(3H)-dioxo-5H-pyrrolo[2,1-a]isoindole-1 - carboxylic acid-γ-chloropropyl ester is obtained from (α-phthalimido-α-phenyl-propionyl)-malonic acid-di-γ-chloropropyl ester; 3 - (4' - methoxybenzyl)-2,5(3H)-dioxo-5H-pyrrolo[2,1-a]isoindole-1-carboxylic acid ethyl ester is obtained from [α - phthalimido - β - (4 - methoxyphenyl) - propionyl]-malonic acid diethyl ester, M.P.97–98°; 3-(4-ethoxybenzyl) - 2,5(3H) - dioxo - 5H - pyrrolo[2,1 - a]isoindole-1-carboxylic acid ethyl ester is obtained from [α-phthalimido-β-(4-ethoxyphenyl)-propionyl]-malonic acid diethyl ester; 2-(3',4'-dimethoxybenzyl)-2,5(3H)-dioxo-5H-pyrrolo[2,1-a]isoindole-1-carboxylic acid ethyl ester, the enol acetate of which melts at 143–145° is obtained from [α-phthalimido-β-(3,4 - dimethoxyphenyl) - propionyl]-malonic acid diethyl ester; 3-phenyl-2,5(3H)-dioxo-5H-pyrrolo[2,1-a]isoindole 1-carboxylic acid-β-benzyloxy-ethyl ester, M.P. 108–110°, is obtained from (α-phthalimido-α-phenylpropionyl)-malonic acid di-β-benzyloxy-ethyl ester; 3-(3',4'-methylenedioxy)-benzyl-2,5(3H)-di-oxo-5H-pyrrolo[2,1-a]isoindole-1-carboxylic acid ethyl ester is obtained from [α-phthalimido-γ-(3,4-methylenedioxy-phenyl)-propionyl]-malonic acid diethyl ester, M.P. 82–83°; 3 − [β - (3',4' - methylenedioxy - phenyl)-ethyl]-2,5(3H) - dioxo - 5H - pyrrolo[2,1-a]isoindole-1-carboxylic acid ethyl ester is obtained from [α-phthalimido-γ-(3,4-methylenedioxy-phenyl)-butyryl] - malonic acid diethyl ester. The starting materials given above can be produced analogously to Example 16.

Example 23

α-Phthalimido-propionyl malonic acid diethyl ester is obtained with α-phthalimido-propionyl chloride analogously to Example 16 and is treated direct in an oily form with pyridine. 3-methyl-2,5(3H)-dioxo-5H-pyrrolo-[2,1-a]isoindole-1-carboxylic acid ethyl ester (M.P. 131°) is obtained.

Example 24

γ-Phthalimido-γ-phenyl-β-oxo-α-butyryl - butyric acid ethyl ester (M.P. 120°) is obtained with butyryl acetic acid ethyl ester analogously to Example 1. With pyridine analogously to Example 19 it produces 1-butyryl-3-phenyl- 5H-pyrrolo[2,1-a]isoindole-2,5(3H)-dione which melts at 168°.

1 - isobutyryl - 3 - phenyl-5H-pyrrolo[2,1-a]isoindole-2,5(3H)-dione is obtained in an analogous manner starting from γ-phthalimido-γ-phenyl-β-oxo-α-isobutyryl-butyric acid ethyl ester, M.P. 190–192°.

*Example 25*

γ-Phthalimido-γ-phenyl-β-oxo-α-benzoyl-butyric acid ethyl ester is obtained with benzoyl acetic acid ethyl ester analogously to Example 1; it melts at 182°. With pyridine analogously to Example 19, 1-benzoyl-3-phenyl-5H-pyrrolo[2,1-a]isoindole-2,5(3H)-dione is obtained, M.P. 217°.

*Example 26*

(α-Phthalimido-isovaleryl)-malonic acid diethyl ester is obtained with α-phthalimido-isovaleryl chloride analogously to Example 16. On heating it with pyridine analogously to Example 16, 3-isopropyl-2,5(3H)-dioxo-5H-pyrrolo[2,1-a]isoindole-1-carboxylic acid ethyl ester is obtained which after recrystallisation from ethanol, melts at 98°.

Also, 3-cyclohexyl-2,5(3H)-dioxo-5H-pyrrolo[2,1-a]-isoindole-1-carboxylic acid ethyl ester (M.P. 124°) is obtained in an analogous manner from (α-phthalimido-α-cyclohexyl-acetyl)-malonic acid diethyl ester (M.P. 90°).

*Example 27*

[α - Phthalimido - β - (3′,4′ - dimethoxyphenyl) - propionyl]-malonic acid diethyl ester is obtained analogously to Example 16 from α - phthalimido - β - (3,4 - dimethoxyphenyl)-propionyl chloride, and is treated direct in the oily form, analogously to Example 19, with pyridine. The crude 3 - (3′,4′ - dimethoxybenzyl) - 2,5(3H) - dioxo-5H-pyrrolo[2,1-a]isoindole-1-carboxylic acid ethyl ester is treated with acetoacetic acid anhydride and sodium acetate which produces the enol acetate. After recrystallisation from alcohol, the enol acetate melts at 143–145°.

3 - (p - methoxybenzyl) - 2,5(3H) - dioxo - 5H - pyrrolo[2,1-a]isoindole-1-carboxylic acid ethyl ester is obtained in an analogous manner from [α-phthalimido-β-(p-methoxyphenyl)-propionyl]-malonic acid diethyl ester, M.P. 97–98°.

*Example 28*

[α-Phthalimido-β-(3,4-methylenedioxy - phenyl) - propionyl]-malonic acid diethyl ester is obtained from the corresponding propionyl chloride by reacting with malonic acid diethyl ester analogously to Example 16. It melts at 82–83° (from ethanol).

If this compound is boiled in pyridine until no more $CO_2$ is liberated, then poured onto ice, acidified with concentrated hydrochloric acid, then 3-(3′,4′-methylenedioxy-benzyl)2,5(3H)-dioxo-5H - pyrrolo[2,1-a]isoindole-1-carboxylic acid ethyl ester is obtained.

*Example 29*

[α - Phthalimido - β - (p - chlorophenyl) - propionyl]-malonic acid diethyl ester is obtained as a crude oil from α - phthalimido - β - (p - chlorophenyl) - propionyl chloride by means of ethoxy magnesium malonic acid diethyl ester analogously to Example 16. This oil is treated direct with pyridine and 3-(p-chlorobenzyl)-2,5(3H)-dioxo-5H-pyrrolo[2,1-a]isoindole-1-carboxylic acid ethyl ester is obtained in the form of orange-red prisms which melt at 161–162° (from ethanol).

*Example 30*

5.27 parts of [α-phthalimido-β-(3,4,5-trimethoxyphenyl)-propionyl]-malonic acid diethyl ester (obtained from α-phthalimido-β-(3,4,5-trimethoxyphenyl)-propionyl chloride and malonic acid diethyl ester analogously to Example 16) in 25 parts by volume of pyridine are refluxed until no more $CO_2$ is liberated. The reaction is complete after about 16 hours. The reaction solution is poured onto ice and acidified with concentrated hydrochloric acid. The sticky product which precipitates is separated and purified. It is 3-(3′,4′,5′-trimethoxybenzyl)-2,5(3H)-dioxo-5H-pyrrolo[2,1-a]isoindole-1-carboxylic acid ethyl ester.

*Example 31*

4.8 parts of [α - phthalimido-β-(p-nitrophenyl)-propionyl]-malonic acid diethyl ester in 30 parts by volume of anhydrous pyridine are refluxed for 12 hours. After cooling, the reaction solution is poured onto ice while stirring vigorously and the pH is adjusted to 2 with concentrated hydrochloric acid. The crude product which precipitates is separated, washed neutral and, after drying in the air, is recrystallised from alcohol. In this way a good yield of 3-(p-nitrobenzyl)-2,5(3H)-dioxo-5H-pyrrolo[2,1-a]-isoindole-1-carboxylic acid ethyl ester is obtained.

*Example 32*

γ - Phthalimido - γ - phenyl - β-oxo-α-acetyl-butyric acid ethyl ester produced according to Example 1, or (α-phthalimido-α-phenyl-acetyl)-malonic acid diethyl ester produced according to Example 16, is heated for 1 hour at about 150° with double to triple the amount of sodium acetate (aqueous or anhydrous). After cooling, the reaction mixture is rubbed with water. The 3-phenyl-2,5-(3H)-dioxo-5H-pyrrolo [2,1-a] - isoindole - 1 - carboxylic acid ethyl ester obtained is filtered off under suction, dried and recrystallised from ethanol of xylene, M.P. 166–167°.

*Example 33*

γ - Phthalimido - δ - phenyl - β - oxo - α - acetyl-valeric acid ethyl ester (see Example 19) is mixed with five times the amount of crystalline sodium acetate and the mixture is heated for 1 hour at 150°. After cooling, the reaction mixture is rubbed with water, the 3-benzyl-2,5(3H)-dioxo-5H-pyrrolo[2,1-a]isoindole - 1 - carboxylic acid ethyl ester formed is filtered off under suction and recrystallised from ethanol. M.P. 135°. (See Examples 9 and 22.)

3 - cyclohexyl - 2,5(3H) - dioxo-5H-pyrrolo[2,1-a]iso-indole-1-carboxylic acid ethyl ester (M.P. 124°; see Example 26) is obtained in an analogous manner from (α-phthalimido - α - cyclohexyl - acetyl) - malonic acid diethyl ester.

*Example 34*

γ - Phthalimido - β - oxo - α - acetyl - butyric acid ethyl ester (see Example 21) is mixed with five times the amount of crystalline sodium acetate and the mixture is heated for 1 hour at 150°. After cooling, the reaction mixture is rubbed with water, the brown mass which precipitates is isolated and this crude product is rubbed with ether whereupon 2,5(3H)-dioxo-5H-pyrrolo[2,1-a]isoin-dole-1-carboxylic acid ethyl ester is obtained.

*Example 35*

2.85 parts of 3 - isopropyl-2,5(3H)-dioxo-5H-pyrrolo [2,1-a]isoindole-1-carboxylic acid methyl ester are dissolved in 20 parts by volume of anhydrous pyridine. The solution is cooled to 0–5° and 0.425 part of sodium borhydride in 15 parts by volume of pyridine are added within about 5 minutes while stirring well and cooling. The solution which is at first red, gradually turns yellowish. On completion of the dropwise addition, 50 parts by volume of ether are added, the whole is stirred for half an hour and then a further 50 parts by volume of ether are added. The reaction product is filtered off under suction, washed with ether and dried in the air. It is the sodium salt of the enol form of 3-isopropyl-2,5(3H)-dioxo - 10,1 - dihydro-5H-pyrrolo[2,1-a]-isoindole-1-carboxylic acid methyl ester. This salt is dissolved in ice water and 2 N-hydrochloric acid or 2 N-sulphuric acid or acetic acid is added until there is an acid reaction (pH 4) whereupon a colourless reaction product precipitates. This is filtered off under suction and recrystallised from alcohol. It melts at 135–137°.

In the same way, 3-cyclohexyl-2,5(3H)-dioxo-10,1-dihydro - 5H - pyrrolo[2,1-a]isoindole-1-carboxylic acid ethyl ester, M.P. 127–128° recrystallised from ethanol, and also 1 -acetyl - 3 - benzyl - 10,1-dihydro-5H-pyrrolo[2,1-a]isoindole-2,5(3H)-dione are produced. After recrystallisation from glacial acetic acid, the latter melts at 206–208°.

Example 36

2.99 parts of 3-isopropyl-2,5(3H)-dioxo-5H-pyrrolo[2,1-a]isoindole-1-carboxylic acid ethyl ester are treated with sodium borhydride analogously to Example 1. The reaction solution is concentrated in vacuo to a small volume and ice water and dilute hydrochloric acid (pH 4) are added to the residue. The precipitated reaction product is washed with water, filtered off under suction and, after decolouration with animal charcoal, recrystallised from ethanol. The colourless crystals which melt at 113–114°, are 3-isopropyl - 2,5(3H)-dioxo-10,1-dihydro-5H-pyrrolo-[2,1-a]isoindole-1-carboxylic acid ethyl ester.

Also 3 - benzyl - 2,5(3H) - dioxo-10,1-dihydro-5H-pyrrolo[2,1-a]isoindole-1-carboxylic acid ethyl ester (colourless crystals, M.P. 108–109°), 3-methyl-2,5(3H)-dioxo - 10,1 - dihydro - 5H -pyrrolo[2,1-a]isoindole-1-carboxylic acid ethyl ester and 2,5(3H)-dioxo-10,1-dihydro-5H-pyrrolo[2,1-a]isoindole-1-carboxylic acid ethyl ester are obtained in an analogous manner.

Example 37

6.06 parts of 1-acetyl-3-phenyl-5H-pyrrolo[2,1-a]isoindole-2,5(3H)-dione are dissolved in 40 parts by volume of anhydrous pyridine. 0.85 part of sodium borhydride in 30 parts by volume of pyridine are added dropwise within about 10 minutes while cooling with ice and stirring. The solution which is at first dark red, gradually becomes dark green and, on completion of the dropwise addition, yellow brown. The reaction solution is stirred for another half hour at 0–5° and then 300 parts by volume of ether are added whereupon a pale yellowish product precipitates immediately. After stirring for a short time and standing at about 5°, the product is filtered off under suction and washed with ether. The filter residue is the sodium salt of the enol form of 1-acetyl-3-phenyl-10,1 - dihydro - 5H - pyrrolo - [2,1-a]isoindole-2,5(3H)-dione. This salt is dissolved in ice water and acetic acid, 2 N-hydrochloric acid or 2 N-sulphuric acid is added to the solution while stirring well until there is an acid reaction (pH 5), whereupon a colourless reaction product precipitates which melts at 155–156° when recrystallised from ethanol.

Also, for example, 1-butyryl-3-phenyl-10,1-dihydro-5H - pyrrolo[2,1 - a]isoindole - 2,5(3H) - dione M.P. 151–152° recrystallised from ethanol; 1-benzoyl-3-phenyl-5H-pyrrolo[2,1-a]isoindole-2,5(3H) - dione, M.P. 171–172° recrystallised from glacial acetic acid; 1-isobutyryl-3 - phenyl - 10,1 - dihydro - 5H - pyrrolo[2,1-a]isoindole-2,5(3H)-dione, M.P. 179–180° recrystallised from ethanol, as well as 1-isobutyryl-3-benzyl-10,1-dihydro-5H-pyrrolo[2,1-a]isoindole-2,5(3H)-dione, M.P. 189–190° recrystallised from glacial acetic acid or ethanol are obtained analogously to the above example.

Example 38

5.72 parts of 1 - cyano - 3 - phenyl - 5H - pyrrolo[2,1-a]isoindole-2,5(3H)-dione are dissolved in 40 parts by volume of pyridine and a solution of 0.85 part of sodium borhydride in 20 parts by volume of pyridine is added while cooling with ice and stirring. On completion of the dropwise addition, the reaction mixture is stirred for another half hour. Then 250 parts by volume of ether are added and the whole is stirred for another hour at 0–5°. The precipitated reaction product is filtered off under suction, washed with ether, dissolved in ice water and 2 N-hydrochloric acid is added until the reaction is slightly acid (pH 5–6). The precipitated crystalline reaction product is 1 - cyano - 3 - phenyl - 10,1-dihydro-5H-pyrrolo[2,1-a]isoindole-2,5(3H)-dione. It is filtered off under suction and recrystallised twice from ligroin whereupon it melts at 106–108°.

Example 39

0.85 part of sodium borhydride, dissolved in 35 parts by volume of pyridine, are slowly added dropwise while stirring and cooling with ice to a solution of 6.66 parts of 3-phenyl-2,5(3H)-dioxo-5H-pyrrolo[2,1-a]isoindole-1-carboxylic acid ethyl ester in 40 parts by volume of pyridine. On completion of the dropwise addition, the reaction mixture is stirred for another 20 minutes under ice cooling, then 150 parts by volume of ether are added, stirring is continued for another 15 minutes and then the precipitated pale green crystal powder is filtered off under suction. This is suspended in water, the suspension is acidified with hydrochloric acid (pH 4) and the 3 - phenyl - 2,5(3H) - dioxo - 10,1 - dihydro - 5H - pyrrolo[2,1-a]isoindole-1-carboxylic acid ethyl ester which is liberated is recrystallised from ethanol and washed with ether/petroleum ether. The colourless platelets so obtained melt at 135–137°.

Example 40

7.35 parts of 3-(p-chlorophenyl)-2,5(3H)-dioxo-5H-pyrrolo[2,1-a]isoindole-1-carboxylic acid ethyl ester are dissolved while stirring well in 50 parts by volume of tetrahydrofuran. The red solution is cooled to 0–5° whereupon a brown suspension is obtained. 0.85 part of sodium borhydride in 20 parts by volume of about 80% ethanol are added dropwise within about 10 minutes to the suspension while stirring well whereupon a colourless product gradually precipitates. On completion of the dropwise addition, the reaction mixture is stirred for one and a half hours at 0° and then 30 parts by volume of ether are added. The reaction product is then filtered off under suction and the fine crystalline filter cake is dried, if desired in vacuo. It is the sodium salt of the enol form of 3-(p-chlorophenyl)-2,5(3H)-dioxo-10,1-dihydro-5H-pyrrolo[2,1-a]isoindole-1-carboxylic acid ethyl ester.

This salt is suspended in ice water and 1 N-sulphuric acid or 2 N-hydrochloric acid or acetic acid is carefully added until the reaction is acid (pH 4). The colourless reaction product is filtered off under suction and recrystallised twice from ethanol whereupon it melts at 153–155°.

Also for example, 3-phenyl-2,5(3H)-dioxo-10,1-dihydro-5H-pyrrolo[2,1-a]isoindole-1-carboxylic acid methyl ester, M.P. 174–176° from ethanol; 3-phenyl-2,5(3H)-dioxo - 10,1 - dihydro - 5H - pyrrolo[2,1 - a]isoindole - 1-carboxylic acid-β-chloroethyl ester, M.P. 148–149° from ethanol; 3-phenyl-2,5(3H)-dioxo-10,1-dihydro-5H-pyrrolo[2,1-a]isoindole-1-carboxylic acid-γ-chloropropyl ester; 3 - p - methoxy - 2,5(3H) - dioxo - 10,1 - dihydro - 5H-pyrrolo[2,1-a]isoindole-1-carboxylic acid methyl ester; 3 - phenyl - 2,5(3H) - dioxo - 10,1 - dihydro - 5H - pyrrolo[2,1 - a]isoindole - 1 - carboxylic acid - β - benzyloxy ethyl ester; 3-p-methylphenyl-2,5(3H)-dioxo-10,1-dihydro-5H-pyrrolo[2,1-a]isoindole-1-carboxylic acid ethyl ester; 3-(p-isopropylphenyl)-2,5(3H),dioxo-10,1-dihydro-5H-pyrrolo[2,1-a]isoindole-1-carboxylic acid ethyl ester; 3 - (3',4' - dimethylphenyl) - 2,5(3H) - dioxo - 10,1 - dihydro-5H-pyrrolo[2,1-a]isoindole-1-carboxylic acid ethyl ester; 3 - phenyl - 2,5(3H) - dioxo - 10,1 - dihydro - 5H - pyrrolo[2,1-a]isoindole-1-carboxylic acid cyclohexyl ester, M.P. 163–164° from ethanol; 3-phenyl-2,5(3H)-dioxo-10,1 - dihydro - 5H - pyrrolo[2,1 - a]isoindole - 1 - carboxylic acid benzyl ester, M.P. 133–135° from ethanol; 3 - (p - methoxyphenyl) - 2,5(3H) - dioxo - 10,1 - dihydro-5H-pyrrolo[2,1-a]isoindole-1-carboxylic acid ethyl ester, M.P. 110–112° from ethanol; 3-p-ethoxyphenyl-2,5(3H) - dioxo - 10,1 - dihydro - 5H - pyrrolo[2,1 - a]isoindole-1-carboxylic acid ethyl ester; 3,(3',4'-methylenedioxyphenyl) - 2,5(3H) - dioxo - 10,1 - dihydro - 5H - pyrrolo[2,1-a]isoindole-1-carboxylic acid methyl ester, M.P. 168-170° from ethanol are obtained analogously to Example 40, and 3-(p-chlorobenzyl)-2,5(3H)-dioxo-10,1-dihydro - 5H - pyrrolo[2,1 - a]isoindole - 1 - carboxylic acid ethyl ester; 3-(p-nitrobenzyl)-2,5(3H)-dioxo-10,1-dihydro - 5H - pyrrolo[2,1 - a]isoindole - 1 - carboxylic acid ethyl ester; 3-(p-methylbenzyl)-2,5(3H)-dioxo-10,1-dihydro - 5H - pyrrolo[2,1 - a]isoindole - 1 - carboxylic acid ethyl ester; 3-(3',4'-dimethylbenzyl)2-,5(3H)-dioxo- 10,1 - dihydro - 5H - pyrrolo[2,1 - a]isoindole - 1 - carboxylic acid ethyl ester; 3-(p-isopropylbenzyl)-2,5(3H)-dioxo - 10,1 - dihydro - 5H - pyrrolo[2,1 - a]isoindole - 1-carboxylic acid ethyl ester; 3-(p-methoxybenzyl)- 2,5(3H) - dioxo - 10,1 - dihydro - 5H - pyrrolo[2,1 - a]isoindole-1-carboxylic acid ethyl ester; 3-(p-ethoxybenyl) - 2,5(3H) - dioxo - 10,1 - dihydro - 5H - pyrrolo[2,1-a]isoindole-1-carboxylic acid ethyl ester; 3-(3',4'-dimethoxybenzyl) - 2,5(3H) - dioxo - 10,1 - dihydro - 5H-pyrollo[2,1-a]isoindole-1-carboxylic acid ethyl ester; 3 - (3',4',5' - trimethoxybenyl) - 2,5(3H) - dioxo - 10,1 - dihydro - 5H - pyrrolo[2,1 - a]isoindole - 1 - carboxylic acid ethyl ester; 3-(3',4'-methylenedioxybenzyl)-2,5(3H)-dioxo - 10,1 - dihydro - 5H - pyrrolo[2,1 - a]isoindole - 1 - carboxylic acid ethyl ester are obtained analogously to Example 39.

This application is a continuation-in-part of application Serial No. 848,914, filed October 27, 1959, now abandoned.

What we claim is:

1. An N-heterocyclic compound selected from the group consisting of compounds of the formulae

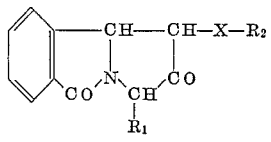

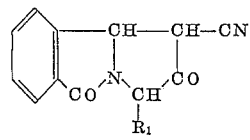

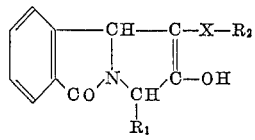

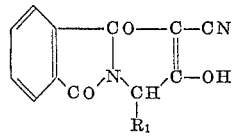

wherein:

X represents a member selected from the group consisting of —CO—O— and —CO—, $R_1$ represents a member selected from the group consisting of halogen, lower alkyl, cyclohexyl, phenyl, chlorophenyl, lower alkylphenyl, lower alkoxyphenyl, methylenedioxyphenyl, benzyl, chlorobenzyl, nitrobenzyl, lower alkylbenzyl, lower alkoxybenzyl and methylenedioxybenzyl, and $R_2$ represents a member selected from the group consisting of lower alkyl, lower chloroalkyl, allyl, cyclohexyl, phenyl, benzyl and benzyloxy-lower alkyl.

2. A process for the production of an N-heterocyclic compound selected from the group consisting of compounds of the formulae

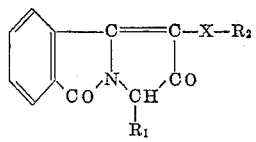

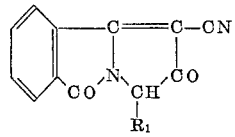

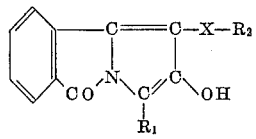

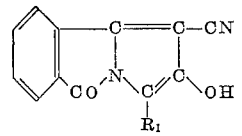

wherein:

X represents a member selected from the group consisting of —CO—O— and —CO—, $R_1$ represents a member selected from the group consisting of hydrogen, lower alkyl, cyclohexyl, phenyl, chlorophenyl, lower alkylphenyl, lower alkoxyphenyl, methylenedioxyphenyl, benzyl, chlorobenzyl, nitrobenzyl, lower alkylbenzyl, lower alkoxybenzyl and methylenedioxybenzyl, and $R_2$ represents a member selected from the group consisting of lower alkyl, lower chloroalkyl, allyl, cyclohexyl, phenyl, benzyl and benzyloxy-lower alkyl, which comprises heating the corresponding one of the compounds of the formulae

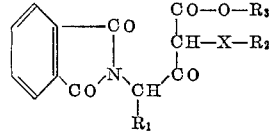

and

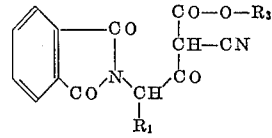

wherein:

$R_3$ represents a member selected from the group consisting of lower alkyl, lower chloroalkyl, allyl, cyclohexyl, phenyl, benzyl and benzyloxy-lower alkyl, in a pyridine base to a temperature between about 100° and boiling temperature of the pyridine base until a substantially equimolecular portion of carbon dioxide is split off.

3. Process according to claim 2 wherein the starting material is boiled in pyridine until a substantially equimolecular portion of carbon dioxide is split off.

4. 3 - (p - chlorophenyl - 2,5(3H) - dioxo - 5H - pyrrolo[2,1-a]isoindole-1-carboxylic acid allyl ester.

5. 1 - acetyl - 3 - methyl - 5H - pyrrolo[2, 1 - a]isoindole-2,5(3H)-dione.

6. 1 - acetyl - 3 - phenyl - 5H - pyrrolo[2,1 - a]isoindole-2,5(3H)-dione.

7. 1 - cyano - 3 - phenyl - 5H - pyrrolo[2,1 - a]isoindole-2,5(3H)-dione.

8. 3 - isopropyl - 2,5(3H) - dioxo - 10,1 - dihydro - 5H-pyrrolo[2,1-a]isoindole-1-carboxylic acid methyl ester.

9. 3 - phenyl - 2,5(3H) - dioxo - 10,1 - dihydro - 5H - pyrrolo[2,1-a]isoindole-1-carboxylic acid ethyl ester.

10. 3 - phenyl - 2,5(3H) - dioxo - 10,1 - dihydro - 5H - pyrrolo[2,1-a]isoindole-1-carboxylic acid benzyl ester.

11. 3 - phenyl - 2,5(3H) - dioxo - 10,1 - dihydro - 5H - pyrrolo[2,1 - a]isoindole - 1 - carboxylic acid - β - chloroethyl ester.

12. 3 - benzyl - 2,5(3H) - dioxo - 10,1 - dihydro - 5H - pyrrolo[2,1-a]isoindole-1-carboxylic acid ethyl ester.

13. 1 - acetyl - 3 - benzyl - 10,1 - dihydro - 5H - pyrrolo[2,1-a]isoindole-2,5(3H)-dione.

14. 1 - butyryl - 3 - phenyl - 10,1 - dihydro - 5H - pyrrolo[2,1-a]isoindole-2,5(3H)-dione.

15. 1 - cyano - 3 -phenyl - 10,1 - dihydro - 5H - pyrrolo[2,1-a]isoindole-2,5(3H)-dione.

References Cited in the file of this patent

Gabriel: Chemische Berichte, vol. 44, pages 70–73 (1911).

Gabriel: Chemische Berichte, vol. 46, pages 1319–1322 (1913).